April 30, 1957 F. C. HOLTZ 2,790,951
HERMETICALLY SEALED WATTHOUR METERS
Filed May 22, 1951 2 Sheets-Sheet 1

INVENTOR.
Frederick C. Holtz,
BY Brown, Jackson,
Boettcher + Dienner
attys.

April 30, 1957     F. C. HOLTZ     2,790,951
HERMETICALLY SEALED WATTHOUR METERS Filed May 22, 1951     2 Sheets-Sheet 2

INVENTOR.
Frederick C. Holtz,
BY Brown, Jackson,
Boettcher + Dienner
Att'ys

United States Patent Office 2,790,951
Patented Apr. 30, 1957

2,790,951

HERMETICALLY SEALED WATTHOUR METERS

Frederick C. Holtz, Springfield, Ill., assignor to Sangamo Electric Company, Springfield, Ill., a corporation of Illinois Application May 22, 1951, Serial No. 227,608

4 Claims. (Cl. 324—156)

The present invention relates to hermetically sealed watthour meters.

Numerous advantages are obtained in a hermetically sealed construction of watthour meter. For example, the total exclusion of all dust, dirt or other air-borne particles from the interior of the meter increases the bearing life of the moving system. Also, the total exclusion of all moisture, fumes or gaseous contamination from the interior of the meter serves to eliminate or minimize corrosion of parts, etc. Still further, changes in the ambient temperature are not effective as quickly on a hermetically sealed meter. These advantages are of importance under all conditions of meter installation, but are particularly important in the case of outdoor installations where the meter is exposed to rain, snow, sleet, etc. The general object of the invention is to provide an improved hermetic sealing arrangement for watthour meters which will be very simple, inexpensive and yet establish an effective seal. As illustrative of one preferred embodiment, the invention has particular utility in a demountable socket type of meter in which the meter unit carrying the rotating system, the registering dials, etc. is adapted for quick and easy mounting in and dismounting from a socket base which is stationarily secured to the wall or other point of meter support. The several circuits enter this socket base and have connection therein with socket clips mounted in the base, these socket clips being adapted to detachably receive terminal prongs projecting from the back side of the demountable meter unit. The demountable meter unit comprises a base plate upon the front side of which are supported the main meter parts, including the energizing coils, moving system, damping magnets, etc. Over these moving parts fits a cup-shaped cover, usually cylindrical and usually composed of glass, which has its rear edge abutting against the front face of said base plate in a dust-excluding or weathertight joint. Projecting rearwardly from the back side of this main base plate are the terminal prongs which have detachable reception in the socket clips or jaws of the socket base for completing the electrical connections from the circuits entering the socket base to the coils of the meter unit.

One of the more specific objects of the invention is to provide an improved hermetic sealing arrangement for the above described socket type of meter. In this arrangement, the sealing medium is carried by the base plate and is effective to establish a hermetic seal between the outer portion of the base plate and the abutting rear edge of the cover; and is also effective to establish a hermetic seal between the base plate and each of the terminal prongs passing therethrough. These terminal prongs must remain insulated from the metallic base plate, and hence the base plate must be provided with openings which are sufficiently large to enable the prongs to pass therethrough out of metallic contact with the edges of the openings. My improved sealing arrangement hermetically seals these openings, and also affords a flexible insulating mounting for the terminals in the base plate which is advantageous in that the flexibility of the mounting enables each terminal to shift slightly if necessary in adapting itself to the terminal receptable in the socket base as the meter unit is pushed into place in its socket mounting. In the preferred embodiment of the invention, I bond a unitary layer or ply of rubber, or synthetic or silicone rubber or the like over the entire outer face of the base plate, so as to establish a hermetic seal between the base plate and the abutting rear edge of the cover, and also to establish hermetic seals between the base plate and each of the terminal prongs, which are thus flexibly mounted in the base plate.

Other objects, features and advantages of the invention will appear from the following detail description of one preferred embodiment thereof. In the accompanying drawings illustrating such embodiment:

Figure 1:
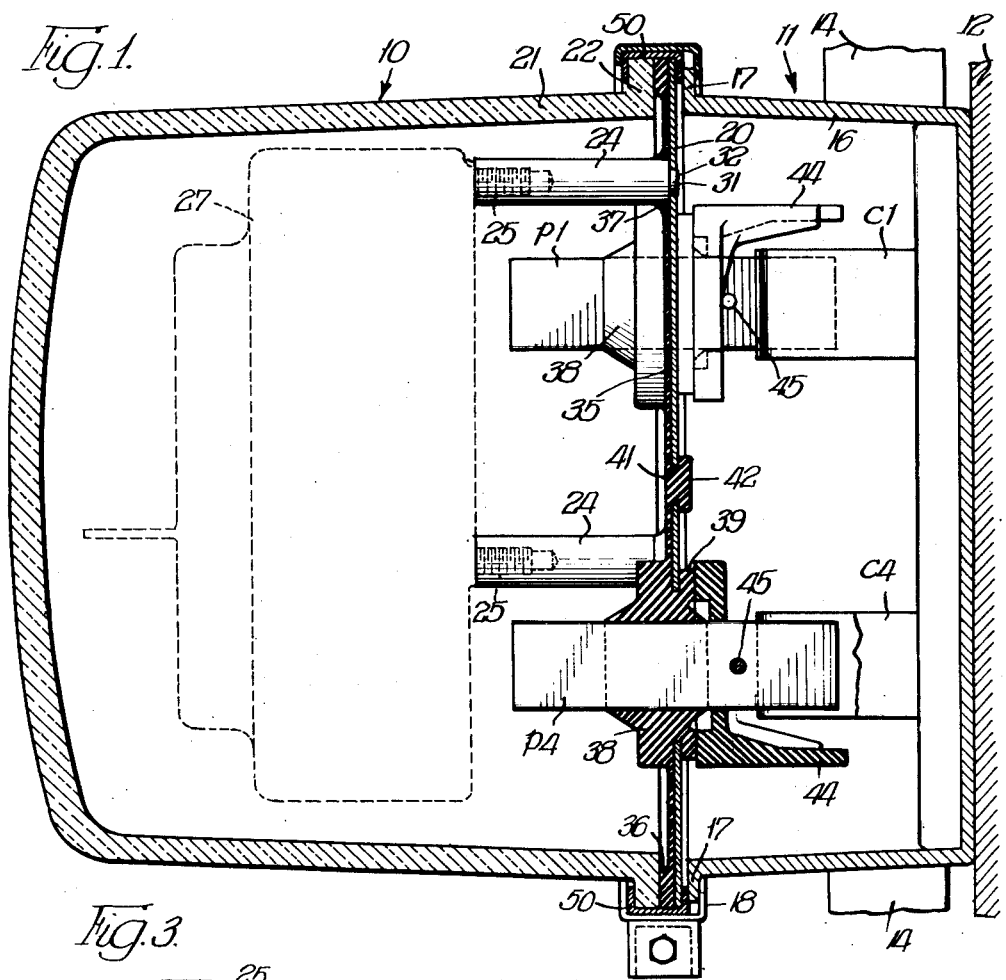
Figure 1 is a transverse sectional view through a socket type of meter embodying my invention, this section corresponding to a section taken approximately on the plane of the line 1—1 of Figure 2.
Figure 3:
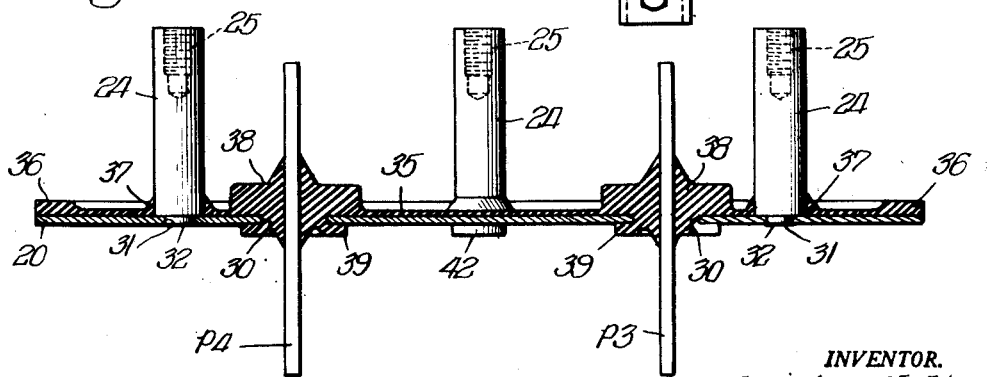
Figure 3 is a transverse sectional view through this base plate substantially at right angles to the plane of the section illustrated in Figure 1, approximately as indicated by the section plane 3—3 of Figure 2.
Figure 2:
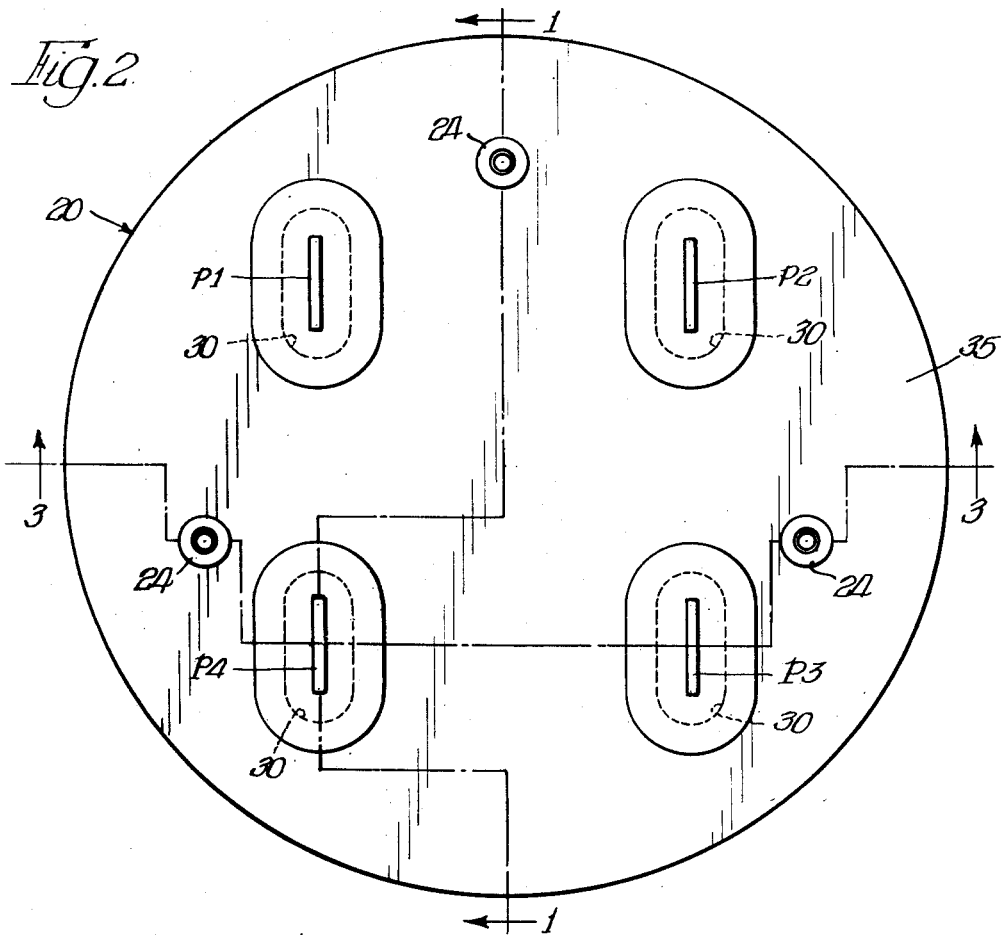
Figure 2 is a front view of the base plate before the meter parts have been mounted thereon.

Referring to Figure 1, the detachable meter unit is indicated in its entirety at 10, and the socket base in which this meter unit has detachable mounting is indicated at 11. The socket base usually has fixed attachment to a wall, a panel, or other support 12, and the supply and load circuits enter this socket base through conduit or B-X connections 14. Mounted within the socket base 11 and insulated from each other are a plurality of spring clips or spring jaws $c1$–$c4$ which have connection with the supply and load circuits entering the socket base, and which are adapted to receive the terminal prongs of the detachable meter unit 10. The dimensions of these socket bases and the arrangement of the terminal clips $c1$–$c4$ are more or less standardized, so that the meters of different manufacturers are interchangeably receivable in such socket base. The circular side wall 16 of the socket base 11 terminates in a circular peripheral flange 17, to which the detachable meter unit 10 is secured by a clamping ring 18, as I shall later describe.

The primary object of the present invention is to make the detachable meter unit 10 a hermetically sealed unit, and I shall now describe the construction by which this object is attained. The detachable meter unit comprises a base plate 20, preferably circular in outline, to which is secured a cup-shaped outer meter cover 21, preferably composed of glass, plastic or other transparent or translucent material, so as to facilitate reading the meter, calibrating disc rotation, etc. The open end of this cover has a peripheral flange 22 for seating against the base plate 20. This base plate 20 is preferably in the form of a flat, brass disc which carries the four terminal prongs $p1$, $p2$, $p3$ and $p4$, which are adapted for reception within the springs clips $c1$–$c4$ supported within the socket base 11. Extending forwardly from the front side of the base plate 20 are three supporting posts 24 having threaded sockets 25 in their front ends. These posts support the operating parts assembly 27, including the several operating parts of the meter, such as the potential and current coils, rotating disc and mounting shaft, damping magnets, registering dials, and demand indicating mechanism, if any. All of these operating parts are collectively indicated by the dotted outline 27.

Referring again to the base plate 20, this base plate is provided with four relatively large oval-shaped openings 30 therein through which pass the terminal prongs p1-p4. The base plate is also provided with three small cylindrical holes 31 in which are riveted, or otherwise secured, the reduced ends 32 of the supporting posts 24. The substantially oval-shaped openings 30 are substantially larger than the transverse dimensions of the terminal prongs, so that these prongs can be supported out of metallic contact with the base plate 20.

Extending across the entire outer face of the base plate 20 is a layer 35 of natural rubber, synthetic rubber, silicone rubber, or the like, which performs the twofold function of a hermetic seal for the meter unit 10, and also establishing an insulating flexible mounting for each of the terminal prongs p1-p4. This layer of rubber 35 is bonded directly to the front face of the disc 20, and is also bonded directly to the supporting posts 24 and to the terminal prongs p1-p4. Adjacent to the periphery of the disc 20, the rubber layer 35 is formed with a thickened ring portion 36 to give a greater thickness of rubber for effecting hermetic sealing engagement against the rear surface of the cover flange 22. As shown in section in Figure 1, the layer of rubber is formed with a fillet 37 surrounding the base of each pillar post 24 and extending out and having bonded attachment to the cylindrical surface of the pillar post. This insures a hermetic seal at each pillar post, so that there is no possibility of leakage through the openings 31 in which the posts are mounted. The layer of rubber is also molded in the form of a relatively thick bushing 38 which surrounds and is bonded to each terminal prong p1-p4. The substantial fore and aft thickness of the bushing 38 adjacent to the terminal prong increases the surface area over which the rubber is bonded to the metallic surface of the terminal, so that the terminal can have a considerable degree of vertical or horizontal flexure in this rubber mounting without the possibility of breaking the bonded joint between the rubber and the metal. A lip 39 of the rubber is extended over the outer or back side of the base plate 20 and is bonded to this back surface, to increase the area of attachment at each opening 30. Such rubber bushings establish a hermetic seal at each terminal prong p1-p4, and at the same time they insulate the prong from the base plate and establish a flexible mounting which enables the prong to deflect itself in any direction or at any angle in the operation of being pushed into the corresponding spring clip or spring jaw c1-c4. In this regard, I wish to point out that by virtue of the bonded attachment of the rubber to the base plate and to the terminal prongs, a hermetic seal is established therebetween without the necessity of maintaining the rubber under compression. This adds to the life of the rubber and the hermetic seal. Still further, with the rubber in this uncompressed state, it affords maximum flexibility of mounting of the terminal prongs p1-p4 in the base plate 20, which permits the prongs to have a greater range of deflection relatively to the base plate, and also to remain in a deflected position over a long period of time without injury to the rubber and without the possibility of leakage.

Also formed in the metallic base plate 20, preferably near the center thereof, is another opening 41 which is completely sealed by a rubber plug 42 formed as an integral part of the rubber layer 35. This plug 42 extends through the opening, and may be flanged over and bonded to the back surface of the base plate 20 around the opening 41. The purpose of providing the opening 41 and plug 42 is to facilitate the introduction of an evacuating needle into the hermetically sealed meter unit for the purpose of evacuating the interior of the meter unit to a greater or lesser degree, as desired. That is to say, after the base plate 20 and meter cover 21 have been joined together as a hermetically sealed unit, an evacuating needle can be pushed through the rubber plug 42 for establishing a sealed communication with the inside of the meter unit. A substantial part of the gaseous contents of the meter unit may be withdrawn through this needle, and, if desired, an inert gas may be introduced into the unit through the needle. Upon the withdrawal of the evacuating needle the opening in the plug 42 immediately seals itself in the act of withdrawing the needle, so that there is no leakage through the plug. The technique of bonding synthetic or silicone rubber to the metallic parts 20, 24 and p1-p4 is well understood in the rubber art.

It is customary in these socket meters to provide the terminal prongs p1-p4 with insulating guard fingers 44 to perform a guiding or guarding function, so that the terminal prongs will be protected against contact with the supporting receptacle or structure when the detachable meter unit is being inserted into the socket base or being removed therefrom. These insulating guard fingers 44, preferably composed of "Bakelite" or the like, can be secured to the terminal prong by a cotter pin or the like 45, preferably with the base end of each guard finger abutting against the outer flange 39 of the rubber bushing 38.

Figure 4:
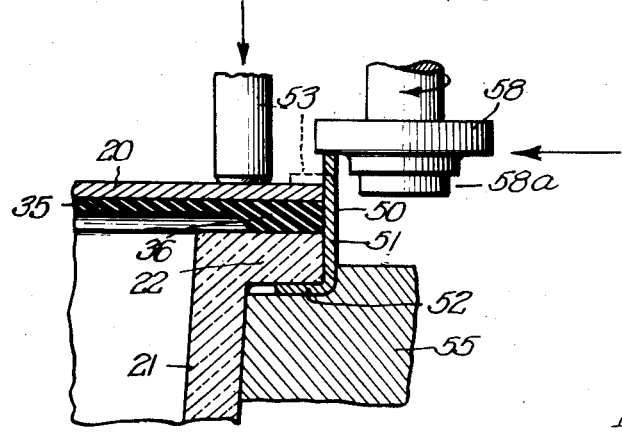
Figure 4 is a fragmentary sectional view showing one method of securing the cover ring over the joint between the outer cover and the base plate carrying the terminal prongs.

The peripheral portion of the base plate 20 and the peripheral flange 22 of the cover 21 are adapted to be secured together by a cover ring 50. Initially, this cover ring is of right angle cross section, comprising an outer wall or band portion 51 and an inwardly extending flange portion 52. Figure 4 diagrammatically illustrates one preferred manner of securing the base plate and heater cover together by this cover ring 50. As shown in this figure, the cover ring 50 is dropped into a right angle recess within a supporting jig or fixture 55, with the radial flange 52 of the cover ring resting against the bottom of the right angle recess. Thereupon, the meter cover 21 is set into the fixture with the front side of its peripheral flange 22 resting upon the radial flange 52 of the cover ring. However, a thin closure or cushioning gasket may be interpposed between the flange 22 and the cover ring, if desired. The base plate 20, with the entire meter assembly 27 and the terminal prongs p1-p4 and guards 44 carried thereby is then placed over the outer or back surface of the cover flange 22. This leaves a small portion of the outer band portion 51 of the covering projecting above the level of the base plate 20. Thereupon, a crimping operation is performed to roll this projecting portion of the flange 51 inwardly over the back surface of the base plate 20, such as by a series of rollers 58 acting under spring pressure. The roller 58 generally operates from a vertical spindle and has a flanged curved portion which first engages the rim of the band which is to be turned over. While the roller 58 is turning it is generally fed in toward the work, as indicated by the arrow, which serves to bend the upturned portion of the ring 50 downwardly against the top of the pie plate or base plate 20, as illustrated. As the roller is forced further over the work, which is at the same time rotating, the partially turned down portion of the ring 50 then engages the flat portion of the roller, thus completing the operation of bending until the somewhat shorter stem 58a of the roller engages the outer periphery of the ring 50. This type of mechanism is well known in the art of sealing cans and the like. Downward pressure is applied to the base plate 20 in the crimping or rolling operation, transmitted either from the crimping rollers themselves, or transmitted through a separate pressure tool bearing downwardly upon the base plate during the crimping operation. This compresses the outer ring portion 36 of the rubber lamina 35 firmly between the base plate and the flange 22 of the meter cover, thereby establishing an effective hermetic seal at this joint between the base plate and the meter cover, the rubber being maintained in this compressed state by the turned-over lip 53 of the cover ring.

After the base plate and meter cover have been secured together by the performance of this crimping operation of the cover ring 50, the interior of the hermetically sealed unit can be evacuated by the introduction of an evacuating needle through the rubber plug 42, as previously described.

The hermetically sealed meter unit is adapted for interchangeable mounting in any one of the socket bases 11 by merely pushing the terminal prongs of the meter unit into the terminal clips of the socket base. Thereupon the clamping ring 18 is secured in position over the flange 17 of the socket base and over the cover ring 50 of the sealed meter unit. This clamping ring 18 can be of any suitable construction, well known to those skilled in the art, adapted to have its ends or separate sections drawn together by one or more clamping screws, which permit the ready mounting and dismounting of the clamping ring in the mounting and dismounting of the detachable meter unit, as typically illustrated in Bradshaw et al. Patent 1,969,499. Such clamping ring may also include provision for receiving a conventional seal for discouraging the unauthorized removal of the meter unit from the socket base.

While I have illustrated and described what I regard to be the preferred embodiment of my invention, nevertheless it will be understood that such is merely exemplary and that numerous modifications and rearrangements may be made therein without departing from the essence of the invention.

I claim:

1. In a hermetically sealed watthour meter, the combination of a circular base plate, supporting posts extending forwardly from the front side of said base plate for mounting operating parts of the meter, a glass cover for enclosing said operating parts, said cover being formed with a rear peripheral clamping flange, terminal prongs mounted in openings in said base plate and projecting rearwardly therefrom for reception in stationary terminal clips in a socket base, a continuous one-piece layer of rubber extending across the entire front surface of said base plate and being molecularly bonded in a substantially uncompressed state to the surface of said base plate and to the base ends of said supporting posts, said rubber layer also spanning said openings in the base plate and being bonded to the adjacent portions of said terminal prongs passing through said openings, the outer peripheral portion of said rubber layer being formed with a thickened rim portion to give a greater thickness of rubber for effecting hermetic sealing engagement against said peripheral clamping flange of the cover, and a cover ring joining said base plate and cover permanently together, said cover ring having one inwardly extending flange engaging the back side of said base plate and another inwardly extending flange overlying the peripheral clamping flange of said cover, one of said latter flanges being crimped or rolled inwardly after the assembly of said base plate and cover and serving to maintain said thickened rim portion of said rubber layer under continuous pressure, said rubber layer being formed with relatively thick bushings at the openings in said base plate, which bushings are bonded over substantial lengths of said terminal prongs and extend through said openings and are bonded to the back side of said base plate around said openings, the outwardly projecting ends of said terminal prongs being adapted to have sliding entrance into the stationary terminal clips of said socket base, said rubber bushings being bonded to said terminal prongs in a substantially uncompressed state, whereby a hermetic seal is established between said terminal prongs and said base plate and whereby said terminal prongs can have a relatively large range of deflection relatively to said base plate for resiliently effecting proper alignment during their sliding entrance into said stationary terminal clips.

2. In a hermetically sealed watthour meter, the combination of a circular base plate, supporting posts extending forwardly from the front side of said base plate for mounting operating parts of the meter, a glass cover for enclosing said operating parts, said cover being formed with a rear peripheral clamping flange, terminal prongs mounted in openings in said base plate and projecting rearwardly therefrom for sliding entrance into stationary terminal clips in a socket base, a continuous one-piece layer of rubber extending across the entire front surface of said base plate and being molecularly bonded in a substantially uncompressed state to the surface of said base plate and to the base ends of said supporting posts, said rubber layer also spanning said openings in the base plate and being bonded to the adjacent portions of said terminal prongs passing through said openings, the outer peripheral portion of said rubber layer being formed with a thickened rim portion to give a greater thickness of rubber for effecting hermetic sealing engagement against said peripheral clamping flange of the cover, said rubber layer being formed with relatively thick bushings at the openings in said base plate, which bushings are bonded over substantial lengths of said terminal prongs and extend through said openings and are formed with outwardly extending lips bonded to the back side of said base plate around said openings, said rubber bushings affording resilient mountings for said terminal prongs enabling said prongs to properly align themselves resiliently with said stationary terminal clips in their sliding entrance into said clips, insulating guard fingers mounted on the outwardly projecting ends of said terminal prongs and comprising base portions abutting against the outer lips of said rubber bushings, and pins passing through said terminal prongs for holding said guard fingers in place.

3. In a hermetically sealed electric watthour meter, the combination of a circular base plate for mounting operating parts of the electric meter, enlarged openings in said base plate, terminal prongs mounted in said enlarged openings and projecting rearwardly therefrom for sliding reception into stationary terminal clips in a socket base, a needle receiving opening in said base plate for receiving an evacuating needle, and a continuous one-piece layer of natural or synthetic rubber extending across the entire front surface of said base plate and being molecularly bonded in a substantially uncompressed state to the surface of said base plate, said rubber layer spanning said enlarged openings in the base plate and being formed with relatively thick bushings in said openings, which bushings are bonded over substantial lengths of said terminal prongs and extend through said openings and are bonded to the back side of said base plate around said openings, whereby to establish a hermetic seal between said terminal prongs and said base plate, said rubber bushings being bonded to said terminal prongs in a substantially uncompressed state, whereby said terminal prongs can have a relatively large range of deflection relatively to said base plate so as to properly align themselves resiliently with said stationary terminal clips in their sliding entrance into said clips, said rubber layer being formed with a relatively thick rubber plug extending through said needle receiving opening and forming a puncturable closure, which is adapted to be penetrated by the evacuating needle at ordinary temperatures, and which is automatically self-sealing when the needle is withdrawn.

4. In a hermetically sealed electric watthour meter, the combination of a circular base plate for mounting the operating parts of the meter, a glass cover for enclosing said operating parts, said cover being formed with a rear peripheral clamping flange, openings formed in said base plate, terminal prongs mounted in said openings and projecting rearwardly from said base plate for push reception into stationary terminal clips in a socket base, and a continuous one-piece layer of rubber-like material extending across the entire front surface of said base plate and being molecularly bonded to the surface of said base plate, the outer peripheral portion of said layer of rubber-like material forming a yieldable sealing ring for sealing engagement against said rear peripheral clamping flange of said cover, said rubber-like layer also spanning said openings in the base plate and being formed with relatively thick bushings at said openings, which bushings are bonded over substantial lengths of said terminal prongs and extend through said openings and are bonded to said base plate around said openings, whereby to establish a hermetic seal between said terminal prongs and said base plate, said rubber bushings being bonded to said terminal prongs and base plate in a substantially uncompressed state, whereby said terminal prongs can have a relatively large range of deflection relatively to said base plate, so as to properly align themselves resiliently with said stationary terminal clips in their push reception into said clips.

References Cited in the file of this patent
UNITED STATES PATENTS

| | | |
|---|---|---|
| 2,117,904 | Mylius | May 17, 1938 |
| 2,128,277 | Young | Aug. 30, 1938 |
| 2,150,282 | Lord | Mar. 14, 1939 |
| 2,298,441 | Waterman | Oct. 13, 1942 |
| 2,320,946 | Madden | June 1, 1943 |
| 2,346,495 | Lingel | Apr. 11, 1944 |
| 2,426,800 | Triplett | Sept. 2, 1947 |
| 2,447,489 | Clark | Aug. 24, 1948 |
| 2,451,516 | Skobel | Oct. 19, 1948 |
| 2,457,535 | Diethert | Dec. 28, 1948 |
| 2,569,925 | Deeley | Oct. 2, 1951 |